US010567822B2

(12) United States Patent
Shaw et al.

(10) Patent No.: US 10,567,822 B2
(45) Date of Patent: Feb. 18, 2020

(54) PROVIDING STREAMED CONTENT RESPONSIVE TO REQUEST

(71) Applicant: Piksel, Inc., Wilmington, DE (US)

(72) Inventors: Philip Shaw, York (GB); Peter Heiland, Dover, MA (US); Sean Everett, New York, NY (US); Ralf Wilhelm Tilmann, Mannheim (DE); Hans-Jurgen Maas, Mainz (DE); Miles Weaver, York (GB)

(73) Assignee: PIKSEL, INC., Wilmington, DE (US)

(*) Notice: Subject to any disclaimer, the term of this patent is extended or adjusted under 35 U.S.C. 154(b) by 0 days.

(21) Appl. No.: 15/736,943

(22) PCT Filed: Jun. 15, 2016

(86) PCT No.: PCT/EP2016/063803
§ 371 (c)(1),
(2) Date: Dec. 15, 2017

(87) PCT Pub. No.: WO2016/202888
PCT Pub. Date: Dec. 22, 2016

(65) Prior Publication Data
US 2018/0184133 A1    Jun. 28, 2018

Related U.S. Application Data

(60) Provisional application No. 62/175,878, filed on Jun. 15, 2015.

(51) Int. Cl.
*H04H 60/33* (2008.01)
*H04N 21/262* (2011.01)
(Continued)

(52) U.S. Cl.
CPC ...... *H04N 21/26233* (2013.01); *H04H 60/46* (2013.01); *H04L 65/607* (2013.01);
(Continued)

(58) Field of Classification Search
CPC ......... H04N 21/2187; H04N 21/26613; H04N 21/2541; H04N 21/2402; H04N 21/23418;
(Continued)

(56) References Cited

U.S. PATENT DOCUMENTS 5,991,799 A * 11/1999 Yen ................... G06F 16/9535
709/218
7,299,275 B2 * 11/2007 Tsukidate ........... H04N 7/17354
348/E7.075
(Continued)

FOREIGN PATENT DOCUMENTS

GB    2 486 033 A    6/2012

OTHER PUBLICATIONS

Wen Gao, et al., "Vlogging: A Survey of Videoblogging Technology on the Web", ACM Comput. Surv. 42, ACM, NY, NY, Jun. 23, 2010.
(Continued)

*Primary Examiner* — Michael B. Pierorazio
(74) *Attorney, Agent, or Firm* — Holzer Patel Drennan

(57) ABSTRACT

There is disclosed a server for providing content, the server being configured to: receive a request defining one or more characteristics of content; access content from a plurality of content sources; and determine content responsive to the request in dependence on the accessed content.

19 Claims, 7 Drawing Sheets

(51) Int. Cl.

| | | |
|---|---|---|
| *H04N 21/231* | (2011.01) | |
| *H04N 21/232* | (2011.01) | |
| *H04N 21/235* | (2011.01) | |
| *H04N 21/24* | (2011.01) | |
| *H04N 21/242* | (2011.01) | |
| *H04N 21/2665* | (2011.01) | |
| *H04N 21/2668* | (2011.01) | |
| *H04N 21/4223* | (2011.01) | |
| *H04N 21/43* | (2011.01) | |
| *H04N 21/4402* | (2011.01) | |
| *H04N 21/442* | (2011.01) | |
| *H04N 21/482* | (2011.01) | |
| *H04N 21/6332* | (2011.01) | |
| *H04N 21/84* | (2011.01) | |
| *H04N 21/8547* | (2011.01) | |
| *H04N 21/218* | (2011.01) | |
| *H04N 21/2187* | (2011.01) | |
| *H04N 21/2343* | (2011.01) | |
| *H04N 21/633* | (2011.01) | |
| *H04N 21/414* | (2011.01) | |
| *H04N 21/433* | (2011.01) | |
| *H04H 60/46* | (2008.01) | |
| *H04N 21/234* | (2011.01) | |
| *H04L 29/06* | (2006.01) | |
| *H04N 21/254* | (2011.01) | |
| *H04N 21/266* | (2011.01) | |
| *H04N 21/258* | (2011.01) | |

(52) U.S. Cl.
CPC ... *H04N 21/2187* (2013.01); *H04N 21/21805* (2013.01); *H04N 21/232* (2013.01); *H04N 21/235* (2013.01); *H04N 21/2343* (2013.01); *H04N 21/2353* (2013.01); *H04N 21/23106* (2013.01); *H04N 21/23418* (2013.01); *H04N 21/23439* (2013.01); *H04N 21/2402* (2013.01); *H04N 21/242* (2013.01); *H04N 21/2407* (2013.01); *H04N 21/2541* (2013.01); *H04N 21/25866* (2013.01); *H04N 21/2665* (2013.01); *H04N 21/2668* (2013.01); *H04N 21/26613* (2013.01); *H04N 21/414* (2013.01); *H04N 21/4223* (2013.01); *H04N 21/433* (2013.01); *H04N 21/4307* (2013.01); *H04N 21/44029* (2013.01); *H04N 21/44204* (2013.01); *H04N 21/440263* (2013.01); *H04N 21/4828* (2013.01); *H04N 21/633* (2013.01); *H04N 21/6332* (2013.01); *H04N 21/84* (2013.01); *H04N 21/8547* (2013.01)

(58) Field of Classification Search
CPC ........... H04N 21/2343; H04N 21/4431; H04N 21/21805; H04N 21/8547
USPC .......................................................... 725/9
See application file for complete search history.

(56) References Cited

U.S. PATENT DOCUMENTS

| | | | | |
|---|---|---|---|---|
| 7,369,749 B2* | 5/2008 | Ichioka | ................ | G11B 27/036 348/E5.097 |
| 7,603,683 B2* | 10/2009 | Reto | ................ | H04L 29/06027 709/204 |
| 7,653,921 B2* | 1/2010 | Herley | .................... | H04N 7/16 725/19 |
| 7,703,116 B1* | 4/2010 | Moreau | ................ | G06F 3/0482 725/45 |
| 7,712,125 B2* | 5/2010 | Herigstad | ............... | H04N 7/163 725/141 |
| 7,734,579 B2* | 6/2010 | White | ..................... | H04N 5/76 707/609 |
| 7,908,625 B2* | 3/2011 | Robertson | ........... | H04L 12/2838 348/552 |
| 8,307,395 B2* | 11/2012 | Issa | ................ | G06Q 10/10 725/46 |
| 8,776,145 B2* | 7/2014 | Hyde | ................ | H04N 21/4126 725/74 |
| 8,839,295 B2* | 9/2014 | Kim | ................. | H04N 21/26283 725/40 |
| 8,966,530 B2* | 2/2015 | Sinha | ................. | H04N 21/4821 725/40 |
| 9,756,349 B2* | 9/2017 | Perlman | ................. | A63F 13/12 |
| 2003/0061206 A1* | 3/2003 | Qian | ................ | G06F 16/48 |
| 2003/0063217 A1* | 4/2003 | Smith | .................... | H04N 7/088 348/460 |
| 2004/0103426 A1* | 5/2004 | Ludvig | ................... | H04H 20/86 725/9 |
| 2004/0148571 A1* | 7/2004 | Lue | ..................... | G06F 16/9577 715/239 |
| 2004/0215718 A1* | 10/2004 | Kazmi | ............... | H04L 65/4084 709/203 |
| 2005/0144455 A1* | 6/2005 | Haitsma | ................ | G06F 16/683 713/176 |
| 2005/0262542 A1* | 11/2005 | DeWeese | ............ | H04L 12/1818 725/106 |
| 2006/0031883 A1* | 2/2006 | Ellis | ....................... | H04N 7/163 725/58 |
| 2006/0031889 A1* | 2/2006 | Bennett | ............. | H04L 29/06027 725/80 |
| 2006/0190966 A1* | 8/2006 | McKissick | ............. | G06Q 30/02 725/61 |
| 2007/0124756 A1* | 5/2007 | Covell | .................... | G06Q 30/02 725/18 |
| 2007/0157281 A1* | 7/2007 | Ellis | .................... | H04N 7/17309 725/134 |
| 2008/0027953 A1* | 1/2008 | Morita | .................... | G11B 27/11 |
| 2008/0059532 A1* | 3/2008 | Kazmi | .................... | G06F 21/10 |
| 2008/0060036 A1* | 3/2008 | Cox | ................. | G06Q 30/02 725/110 |
| 2008/0215170 A1* | 9/2008 | Milbrandt | ............. | H04L 65/604 700/94 |
| 2008/0235733 A1* | 9/2008 | Heie | ....................... | H04N 7/163 725/46 |
| 2009/0037954 A1* | 2/2009 | Nagano | .................. | H04H 60/72 725/39 |
| 2009/0119708 A1* | 5/2009 | Harrar | ....................... | G06F 8/38 725/39 |
| 2009/0148124 A1 | 6/2009 | Athsani | | |
| 2009/0320058 A1* | 12/2009 | Wehmeyer | ......... | H04N 7/17336 725/31 |
| 2009/0320072 A1* | 12/2009 | McClanahan | ....... | H04N 5/44543 725/47 |
| 2009/0320073 A1* | 12/2009 | Reisman | ................. | G06F 16/954 725/51 |
| 2010/0121936 A1* | 5/2010 | Liu | .................... | H04N 5/44543 709/217 |
| 2010/0131385 A1* | 5/2010 | Harrang | ................. | G06Q 30/00 705/26.1 |
| 2010/0251292 A1* | 9/2010 | Srinivasan | ............. | H04H 20/57 725/37 |
| 2010/0296487 A1* | 11/2010 | Karaoguz | ........... | H04W 84/045 370/332 |
| 2011/0066744 A1* | 3/2011 | Del Sordo | ........... | H04N 21/235 709/231 |
| 2011/0068899 A1* | 3/2011 | Ioffe | ........................ | G05B 15/02 340/8.1 |
| 2011/0086619 A1* | 4/2011 | George | ................ | H04M 1/72533 455/414.1 |
| 2011/0138064 A1* | 6/2011 | Rieger | ............. | H04N 21/25816 709/228 |
| 2011/0191439 A1* | 8/2011 | Dazzi | ..................... | G06F 15/16 709/217 |
| 2011/0191446 A1* | 8/2011 | Dazzi | ..................... | G06F 15/16 709/219 |

(56) References Cited

U.S. PATENT DOCUMENTS

| | | | | |
|---|---|---|---|---|
| 2012/0117590 A1* | 5/2012 | Agnihotri | ........ | H04N 21/25816 725/30 |
| 2012/0278725 A1* | 11/2012 | Gordon | .............. | H04N 21/2665 715/738 |
| 2012/0291079 A1* | 11/2012 | Gordon | .............. | H04N 21/2665 725/109 |
| 2014/0007154 A1 | 1/2014 | Seibold et al. | | |
| 2014/0013342 A1* | 1/2014 | Swan | ................. | H04N 21/2343 725/5 |
| 2015/0043892 A1 | 2/2015 | Groman | | |

OTHER PUBLICATIONS

International Search Report and Written Opinion for Application PCT/EP2016/063803, issued by the European Patent Office, dated Sep. 23, 2016.

Pereira F. et al., "Multimedia Retrieval and Delivery: Essential Metadata Challenges and Standards", Proceedings of the IEEE, New York, vol. 96, No. 4, Apr. 1, 2008.

Tag, Benjamin, et al., "Collaborative Storyboarding Through Democratization of Content Production", Advances in Computer Entertainment Technology, ACM, New York, Nov. 11, 2014.

Hesselman, Cristian, et al., "Sharing Enriched Multimedia Experiences Acoss Heterogeneous Network Infrastructures", IEEE Communications Magazine, vol. 48, No. 6, Jun. 1, 2010.

\* cited by examiner

PROVIDING STREAMED CONTENT RESPONSIVE TO REQUEST

BACKGROUND TO THE INVENTION

Field of the Invention

The present invention relates to the provision of content responsive to a request for content.

Description of the Related Art

It is known in the art to provide content for consumption.

Finding content to watch in a live-streaming environment can be challenging. There are unique difficulties in providing a content discovery process for ephemeral content which is short-lived and transitory in nature, such as content provided by ad-hoc live streaming.

When searching for content or compiling a playlist of live and near-live streams, not every request can be fulfilled successfully. Some themes, terms or combination of criteria may not yield any results at all; others may exist but be out of date or not be a sufficiently close match. Traditionally, such details of these failed searches and fulfilment requests have simply been discarded.

It is an aim to provide content based upon demand for particular content.

SUMMARY OF THE INVENTION

There is provided a technique for allowing viewers to request the creation or provision of content.

Content may be video content (such as a video stream), audio content, an image, a blog entry, a website link etc. In general 'content' refers to any information or information source.

There is provided a solution to the problem of how viewer's search and fulfilment requests can be used to drive content generation or acquisition in a content delivery platform.

Details of failed searches or failed fulfilment requests may not be discarded: they may be used to provide intelligence about what users of viewing devices want to see on the platform.

The request preferably defines characteristics of desired content, and the request is fulfilled based on assessment of characteristics of content provided from content sources. The fulfilment of the request may include requesting content from particular content sources. The content sources may be remote from a device receiving the request. The device receiving the request may have a memory, and the memory may provide one content source.

Although a request may be fulfilled by requesting content, it may also be fulfilled by existing content; content currently streamed; and/or content currently stored. It may be determined if the request can be fulfilled in this way before requesting content from content sources.

Content sources may generate video streams based on the capture of images.

Content can be sourced from an external repository. For example if a large number of users request a specific piece of rights protected content, then the system may attempt to acquire the rights to that piece of content in those regions in which the most requesting users are located.

The invention is particularly but not exclusively concerned with the capture of images and the generation of associated video streams in a video streaming environment comprising a plurality of capture devices (such as mobile phones) connected to a streaming server via one or more networks such as the Internet. In dependence on the received captured video streams the streaming server may generate one or more further video streams for viewing by one or more viewing devices.

In general an example may provide a method of: receiving a request for a content (e.g. a video stream), the request defining characteristics (e.g. metadata) of the requested content; identifying sources (e.g. capture devices) associated with the characteristics of the request; and transmitting the request to the identified sources.

The metadata may be a target identity, a geolocation, or a subject. A target may be particular capture devices, or a particular user or users. A geolocation may be a geographic location. A subject may be an identification of an event, or the identification of a topic of interest.

In the identifying step and the transmitting step, the request is actioned, and then is fulfilled when the requester receives content and accepts that some or all of the items and content satisfy the request.

A particular use example could be a car race where the driver of the car has requested that he be filmed at certain locations. Thus the driver creates the request, the metadata of that request defining the locations and the identity of the car for example.

A request is preferably received from a viewing device. However a request may be received from another resource. For example, statistics about coverage of a particular event may cause an event coordinator or controller to generate a request to fulfil a particular need. For example an event coordinator of a golf tournament may identify that there is currently no one filming at the 9th hole of a golf tournament, and thus generate an appropriate request.

A request may be to contribute to an event instigated by a person who starts capturing the event. For example someone could start filming a football match and simultaneously create or upload a request for other users located in the same area to simultaneously film the event.

In an example there is provided a method of: determining an event; determining capture devices associated with that event; and requesting content from those determined capture devices.

The step of determining an event may comprise receiving notification of establishment of an event. The step of determining an event may comprise identifying establishment of an event.

The step of determining capture devices associated with the event may comprise identifying capture devices having one or more characteristics associated with the one or more characteristics of the event. The step of determining capture devices associated with the event may comprise identifying capture devices having one or more characteristics matching with one or more characteristics of the event. The characteristics may be location or any metadata such as: geolocation; field of view of the capture device's camera or other recording sensors, etc.

The characteristics of the capture device may be current characteristics of the capture device or previously known characteristics of the capture device or previously known characteristics of the users associated with the capture device (profile information).

A viewing device may provide a content (or viewing) request to a streaming server, or a streaming server may also receive a local request for example generated by an "event" which has been identified. This may be generated by, for example, an administrator associated with the event. The metadata associated with the request being either a local request or a viewing request from a viewing device is received, and is compared with metadata associated with the storage of a memory of the streaming server or other content source. The comparator is adapted to transmit a request to capture devices in accordance with the comparison operation. The capture devices may thus be controlled in order to provide video streams "on demand" based on demand requirements or requests from either an "event" or a viewing device.

An example use case is a request for content from a news organisation. In a news organisation case, a request for content may be a standing definition of content that would be of interest, which request is fulfilled but maintained whenever suitable content is identified.

More particularly, in a first aspect there is provided a server for providing content, the server being configured to: receive a request defining one or more characteristics of content; access content from a plurality of content sources; and determine content responsive to the request in dependence on the accessed content.

The server may be configured to output content responsive to the request in dependence on the accessed content.

The server may be configured to receive feedback relating to the output content from one or more devices in receipt of the output content. The server may be configured to modify the output content in dependence on the feedback.

The server may comprises a memory, and one of the content sources may be the server memory.

The server may be configured to receive streamed content from one or more content sources.

The server may be configured to request one or more content sources to deliver content in dependence upon the request. The may be configured to determine a content source to send a request to. The server may determine one or more content sources most likely to be associated with the characteristics of the request in dependence on previous content received at the server from the one or more content sources. The server may transmit a request for content to content sources if the request cannot be fulfilled by existing content. The server may transmit the further request to content sources to enhance the request fulfilment provided by existing content.

The server may be configured to store the request.

The request may define a time period for which content is requested.

The request may define an event for which content is requested.

The request may be from a device requesting content to view.

The request may be from a rights holder, rights holder content being determined.

The server may include a store to store the request.

An aspect also provides a method for providing content, the method comprising: receiving a request defining one or more characteristics of content; accessing content from a plurality of content sources; and determining content responsive to the request in dependence on the accessed content.

The method may further comprise outputting content responsive to the request in dependence on the accessed content.

The method may further comprise receiving feedback relating to the output content from one or more devices in receipt of the output content. The method may further comprise modifying the output content in dependence on the feedback.

The method may further comprise receiving streamed content from one or more content sources.

The method may further comprise requesting content from one or more content sources in dependence upon the request. The method may further comprise determining a content source to send a request to. The method may further comprise determining one or more content sources most likely to be associated with the characteristics of the request in dependence on previous content received at the server from the one or more content sources.

The method may further comprise transmitting a request for content to content sources if the request cannot be fulfilled by existing content.

The method may further comprise requesting content sources to enhance the request fulfilment provided by existing content.

The method may further comprise storing the request.

The request may define a time period for which content is requested.

The request may define an event for which content is requested.

The method may further comprise receiving the request from a device requesting content to view.

The method of any one of claims may further comprise receiving the request from a rights holder, and determining rights holder content.

BRIEF DESCRIPTION OF FIGURES

The invention is now described by way of reference to the accompanying figures, in which.

DESCRIPTION OF PREFERRED EMBODIMENTS

Figure 1:
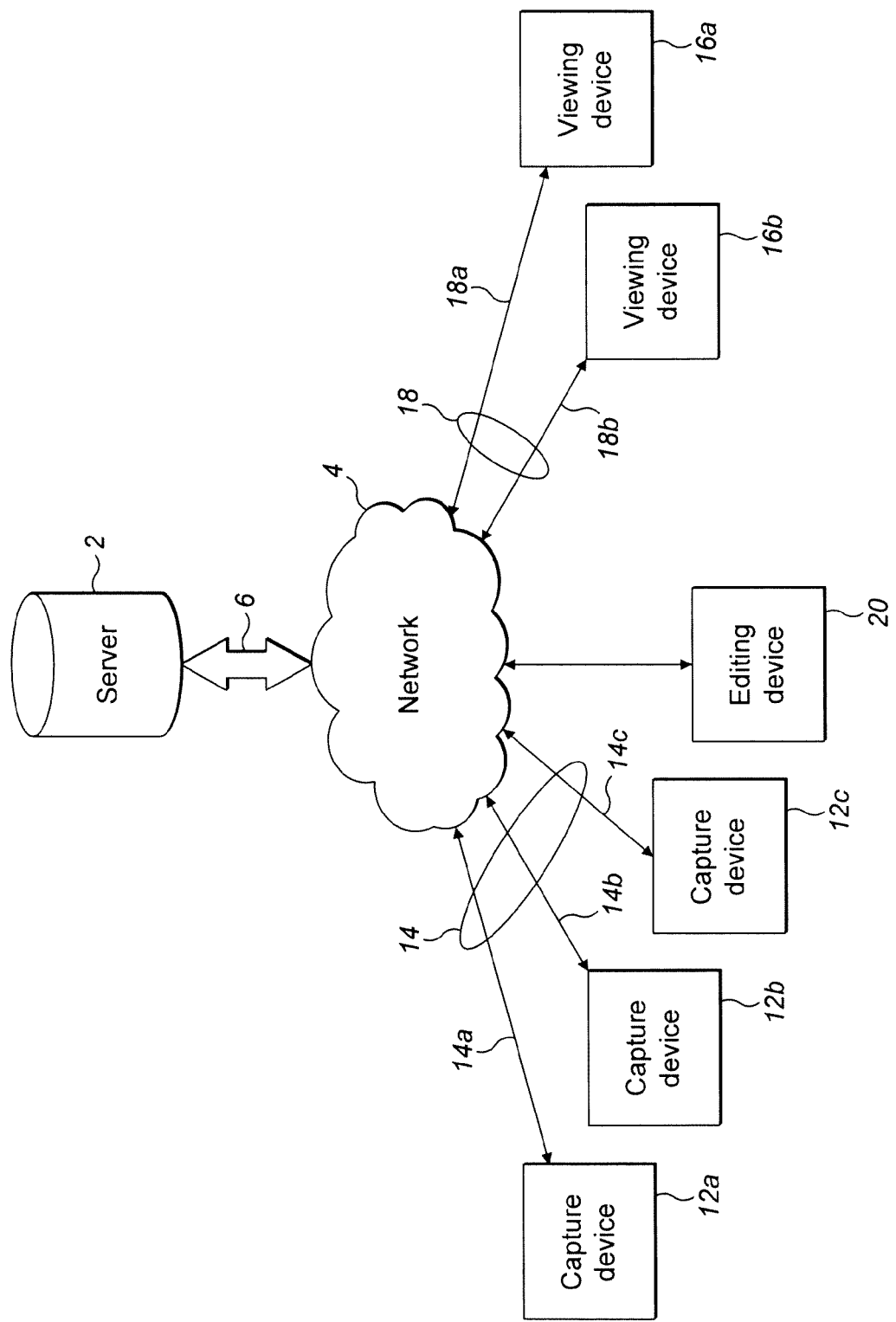
FIG. 1 discloses an example architecture for delivering content to satisfy requests.

With reference to FIG. 1 there is illustrated a system architecture within which embodiments of the invention may be implemented.

With reference to FIG. 1 there is illustrated: a plurality of devices, labelled capture devices, denoted by reference numerals 12a, 12b, 12c; a plurality of devices, labelled viewing devices, denoted by reference numerals 16a, 16b; a device, labelled editing device, denoted by reference numeral 20a; a network denoted by reference numeral 4; and a server denoted by reference numeral 2.

Each of the devices 12a, 12b, 12c is referred to as a capture device as in the described embodiments of the invention the devices capture content. However the devices are not limited to capturing content, and may have other functionality and purposes. In examples each capture device 12a, 12b 12c may be a mobile device such as a mobile phone.

Each of the capture devices 12a, 12b, 12c may capture an image utilising a preferably integrated image capture device (such as a video camera), or have a connection to external systems capable of retrieving content matching a set of criteria. This may, for example, be to access rights holder protected content. Each capture device may thus generate a video stream on a respective communication line 14a, 14b, 14c. The respective communication lines 14a, 14b, 14c provide inputs to the network 4, which is preferably a public network such as the Internet. The communication lines 14a, 14b, 14c are illustrated as bi-directional, to show that the capture devices 12a, 12b, 12c may receive signals as well as generate signals.

The server 2 is configured to receive inputs from the capture devices 12a, 12b, 12c as denoted by the bi-directional communication lines 6, connected between the server 2 and the network 4. In embodiments, the server 2 receives a plurality of video streams from the capture devices, as the signals on lines 14a, 14b, 14c are video streams.

The server 2 may process the video streams received from the capture devices as will be discussed further hereinbelow.

The server 2 may generate further video streams on bi-directional communication line 6 to the network 4, to the bi-directional communication lines 18a, 18b, associated with the devices 16a, 16b respectively.

Each of the devices 16a, 16b is referred to as a viewing device as in the described embodiments of the invention the devices allow content to be viewed. However the devices are not limited to facilitating the viewing of content, and may have other functionality and purposes. In examples each viewing device 16a, 16b may be a mobile device such as a mobile phone.

The viewing devices 16a and 16b may be associated with a display (preferably an integrated display) for viewing the video streams provided on the respective communication lines 18a, 18b.

A single device may be both a capture device and a viewing device. Thus, for example, a mobile phone device may be enabled in order to operate as both a capture device and a viewing device.

A device operating as a capture device may generate multiple video streams, such that a capture device such as capture device 12a may be connected to the network 4 via multiple video streams, with multiple video streams being provided on communication line 14a.

A viewing device may be arranged in order to receive multiple video streams. Thus a viewing device such as viewing device 16a may be arranged to receive multiple video streams on communication line 18a.

A single device may be a capture device providing multiple video streams and may be a viewing device receiving multiple video streams.

Each capture device and viewing device is connected to the network 4 with a bi-directional communication link, and thus one or all of the viewing devices 16a, 16b may provide a signal to the network 6 in order to provide a feedback or control signal to the server 2. The server 2 may provide control signals to the network 4 in order to provide control signals to one or more of the capture devices 12a, 12b, 12c or one or more of the viewing devices 16a, 16b. The control signals may, e.g., be used to highlight different streams when multiple streams exist.

The capture devices 12a, 12b, 12c are preferably independent of each other, and are independent of the server 2. Similarly the viewing devices 16a, 16b are preferably independent of each other, and are independent of the server 2. When devices are independent, there is no relationship between them: for example they do not exchange timing information between each other.

The capture devices 12a, 12b, 12b are shown in FIG. 1 as communicating with the server 2 via a single network 4. In practice the capture devices 12a, 12b, 12c may be connected to the server 2 via multiple networks, and there may not be a common network path for the multiple capture devices to the server 2. Similarly the viewing devices 16a, 16b may be connected to the server 2 via multiple networks, and there may not be a single common network path from the server 2 to the viewing devices 16a, 16b.

Also shown in FIG. 1 is the editing device 20, connected to the network 4 by bi-directional communication link 22. The editing device, which may additionally function as a capture device and/or a viewing device, may be used to provide additional control information to the server 2, and as a result to capture devices and viewing devices.

The system architecture of FIG. 1 may be used to provide a content delivery system in which content fulfils a request from a viewer.

Figure 2:
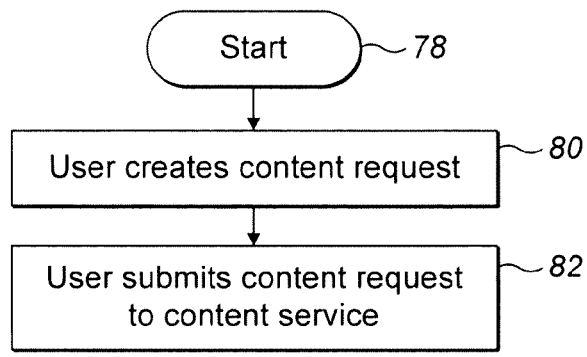
FIG. 2 illustrates an exemplary process for generating a request.

With reference to FIG. 2, there is illustrated a process for how a viewer (such as a user of a viewing device) establishes a request. In the described example the requester is the user of a viewing device, such as device 16a or 16b.

The process starts in step 78, and then in step 80 a user creates a content request. In general the content request may contain one or more of: the desired location or geo-fenced area; keywords; a description; whether only live matches are appropriate; or any other appropriate or similar metadata. As noted the user may include a description in the request: thus the user may describe the content they are looking for as free text.

It will be understood that any request, and any content, is associated with metadata, which is a collection of data that describes other data—specifically in the present context the metadata describes content or describes what requested content should comprise or not comprise.

The request may contain at least a list of tags, or a description capable of being transformed into a list of tags, that describe the required content but may also include a message with more detailed requirements; a deadline for content; and notes on intended usage. The requester may also offer a fee to purchase content, or request particular sets of reuse rights. Likewise, they may describe, using tags, or information which may be transformed into tags, things which should not appear in the content.

In general the request contains metadata, defining characteristics of the requested content, or characteristics which should not be associated with the requested content.

In step 82 the request is submitted to a content service provided by the server 2. The request is thus transmitted from one of the viewing devices 16a or 16b to the server 2.

Figure 3:
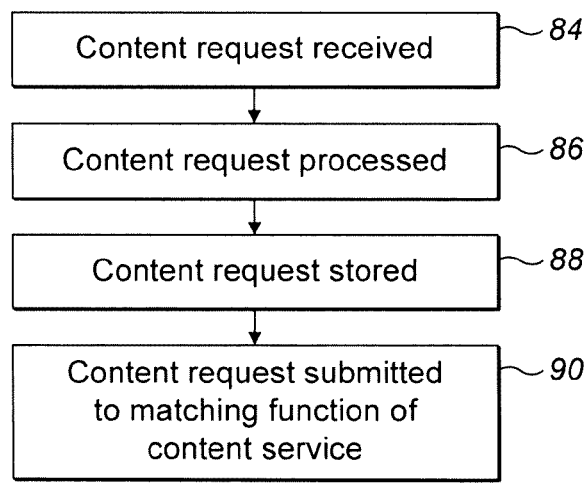
FIG. 3 illustrates an exemplary process for receiving a request.

FIG. 3 illustrates the receipt and initial handling of the request at the server 2.

In step 84 the content request is received by the server 2, and in step 86 initial processing on the request is carried out.

This initial processing may be to organise or formulate the tags. Where a description or free text has been used, tags may be generated therefrom.

In processing the content request in step 86, the request—which may include free text—is broken down semantically, by the system, into a series of key words and phrases. Tags are then created for the request. These tags are used to search content for matches that might fulfil the request.

In a step 88 the content service stores the content request and marks it as 'awaiting confirmation'.

The stored content request will keep a record of the life cycle of the request: fulfilled, abandoned, pending etc., together with details of which events/streams were marked as fulfilling or not fulfilling the request.

Requests, or "calls" for content, are entered into an online catalogue as part of the storing step 88 that other users may browse. This catalogue is indexed and categorised based on the tags, fees, rights requested and so on.

In a step 90 a query is submitted to a content matching function of the content service.

In a first example, the matching function implements a matching check for the request of live streams. This is illustrated further in FIG. 4.

In this example, it is assumed that content is available at the server 2 in a live stream.

Content (in this example streamed content) has metadata with tags, and thus is tagged similarly to the tagging applied to a request, so that the content can be compared to requests to identify matches. For example live content is tagged, in real time, to describe the characteristics of the content such as what is going on in the content of a video. This tagging of live content uses an automated process that analyses both the video and audio aspects of the material.

The tags of the request are used to search the current collection of live streams (and/or a current collection of stored content).

Figure 4:
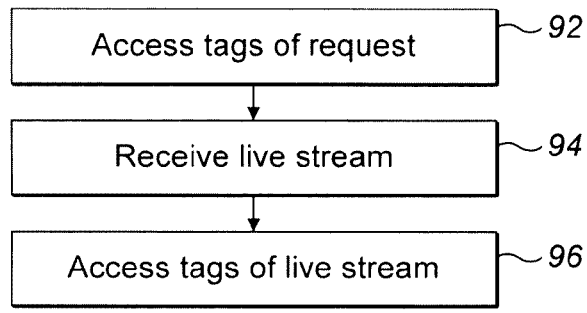
FIG. 4 illustrates an exemplary process for assessing live streams in comparison to a request.

Referring to FIG. 4, in a step 92 tags of the request are accessed. In a step 94 the live stream is received at the server 2, and then in a step 96 tags of the live stream are accessed.

Figure 5:
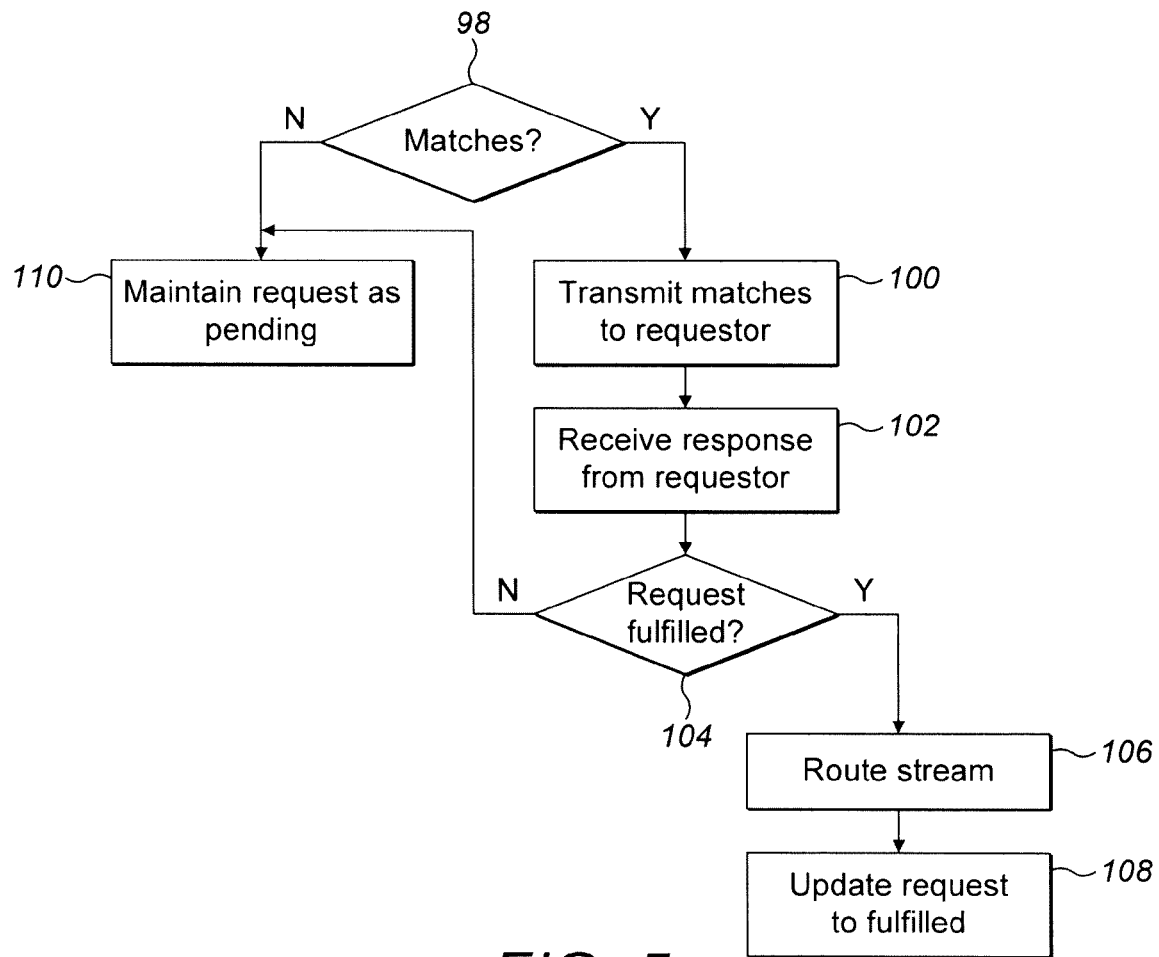
FIG. 5 illustrates an exemplary process for assessing live streams in comparison to a request.

With reference to FIG. 5, for the live stream a determination is then made as to whether any matches are found.

In a step 98 it is determined whether any matches are found. If no matches are found, then in a step 110 the status of the request is maintained as pending. If matches are found, then the matching function moves on to step 100.

In step 100, the server 2 transmits any matches to the requester, i.e. the viewing device which generated the request.

Figure 6:
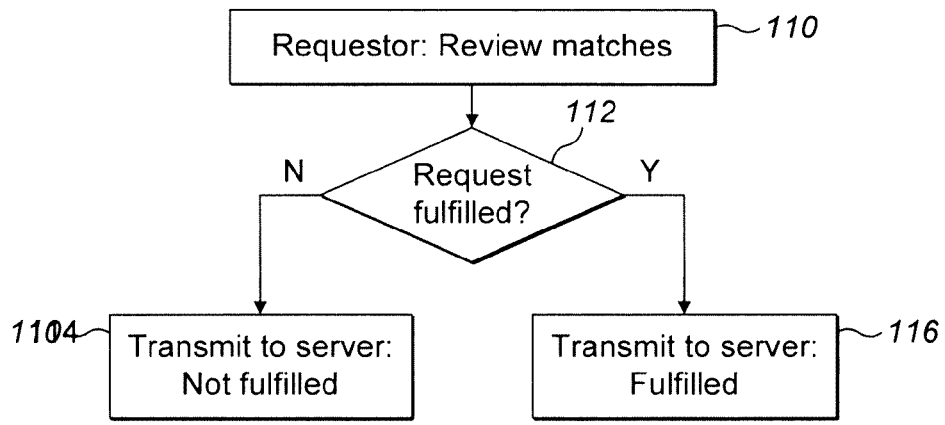
FIG. 6 illustrates an exemplary process for a requestor to assess the suitability of a live streams to a request.

Turning to FIG. 6, at the viewing device the requester receives the review matches. In a step 112, the requester then makes a determination as to whether the request is fulfilled. This may be achieved, for example, by the matches being displayed on a display of a viewing device, and the requester manually selecting or rejecting the displayed matches.

If it is determined that a request is not fulfilled, then in a step 114 the viewing device transmits a message to the server indicating that the request is not fulfilled.

If it is determined that a request is fulfilled, then in a step 116 the viewing device transmits a signal to the server indicating that the request has been fulfilled.

Returning to FIG. 5, in a step 102 the matching function receives the response from the requester viewing device.

In a step 104 the matching function then determines whether or not the request has been fulfilled, based on the response it has received from the requester viewing device.

If the request has not been fulfilled, then the matching function reverts to step 110, and the request is maintained as pending.

If the request has been fulfilled, then in a step 106 the stream associated with the fulfilment of the request is continued to be routed to the viewing device, and then in a step 108 the request associated with this matching operation is updated to indicate that it has been fulfilled.

In this example, once a requester accepts a stream the request is deemed to be fulfilled. In other examples, the request may remain open. The requesting user may see one or more streams which meet the request requirements, and accept them, but they may still leave the request open as unfulfilled/pending in order to get more matches.

The match process may fulfil requests in one or two ways.

A contributing user may 'claim' a request by offering to provide the live stream as described. A contributing user is a user of one of the capture devices 12a, 12b, 12c providing a live stream. During the stream, the system performs its usual audio/video analysis of the content, and checks off those tags which should or should not appear in the stream delivered to the viewing device.

This contributor may also, by arrangement with the requester, submit pre-recorded content in cases where a request cannot be fulfilled at a time that's convenient for the requester to watch live (e.g. a requester is in London but wants a video of the Sydney Opera House at daybreak). The nature of this request is established by the tags.

A requester may accept or reject a particular submission as described above. Rejections mean that the request stays open for another user to attempt to fulfil it, but also that any rights to the rejected content remain with its contributor.

As part of this process, the requester is notified of the attempted fulfilment, and is given an option to accept, reject or modify that fulfilment as described above.

The second fulfilment method is automatic. As capture users of capture devices engage with the platform, the audio/video analysis may, from time to time, match a capture stream with a requester's needs. These 'unintentional' matches are made available to the requester to review, either as they happen or later.

If the requester considers a stream meets its requirements, it can mark the request as fulfilled or, where a payment or rights are required, the same terms may be offered to the contributor (the user of the capture device) who may accept or reject them, closing or leaving the request open respectively. As above, a requester may leave open a request in order to accumulate many accepted matches.

From the above it can be understood that rather than this being a marketplace of sellers, this is a marketplace of buyers looking for contributors to create suitably crafted output.

In general, a requester is given an opportunity to review any existing content, whether live now or available on demand. The requestor may judge some of this content to be good matches for their request and may either indicate that it is therefore fulfilled or leave the request open for any future matches.

Requesters may create an open request for content that alerts them any time interesting content becomes available. This feature, while using much of the same logic, delivers more of an active search function that allows content to find viewers in real time.

When dealing with live content where contributors may be broadcasting for only a short time and where they lack the time or convenience to describe accurately what they are filming, passive discovery is unlikely to be successful. For example, the chances of a viewer being on the system and searching for something at the same moment as a contributor 'lights up' their camera and broadcasts is slim.

What is better is to allow viewers to articulate their needs (or deduce them) and let the system actively monitor for suitable content and bring the user to the content as it finds matches.

Thus once the request has been received and stored by the service (tagged), an automatic process can deliver any incoming live content to the viewer which appears to fulfil their request. Even if the content is accepted by the viewer, the request is left open (and remains as pending) so that further content can be delivered in such an automatic way on an ongoing basis.

Figure 7:
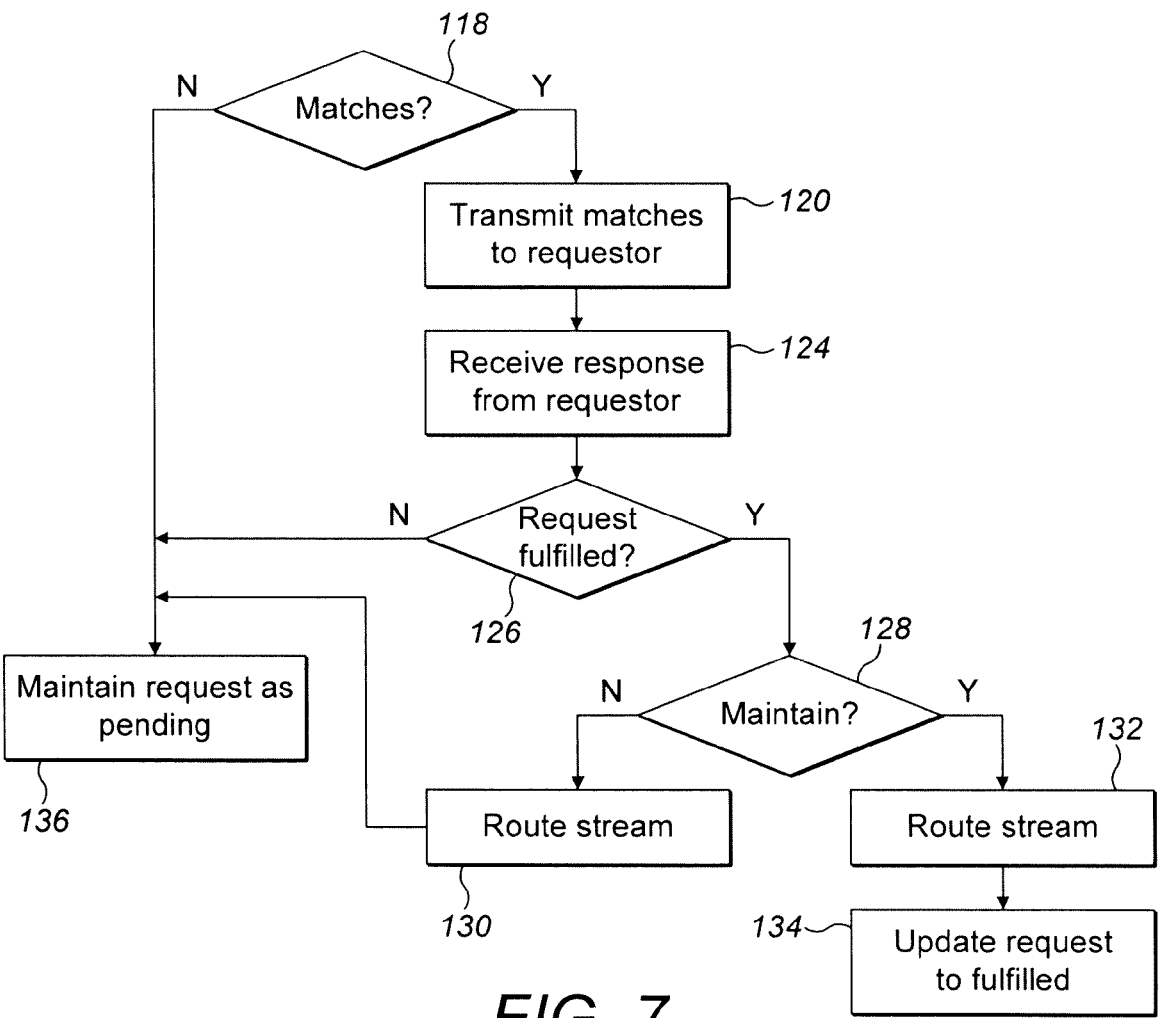
FIG. 7 illustrates an exemplary process for assessing live streams in comparison to a request.
Figure 8:
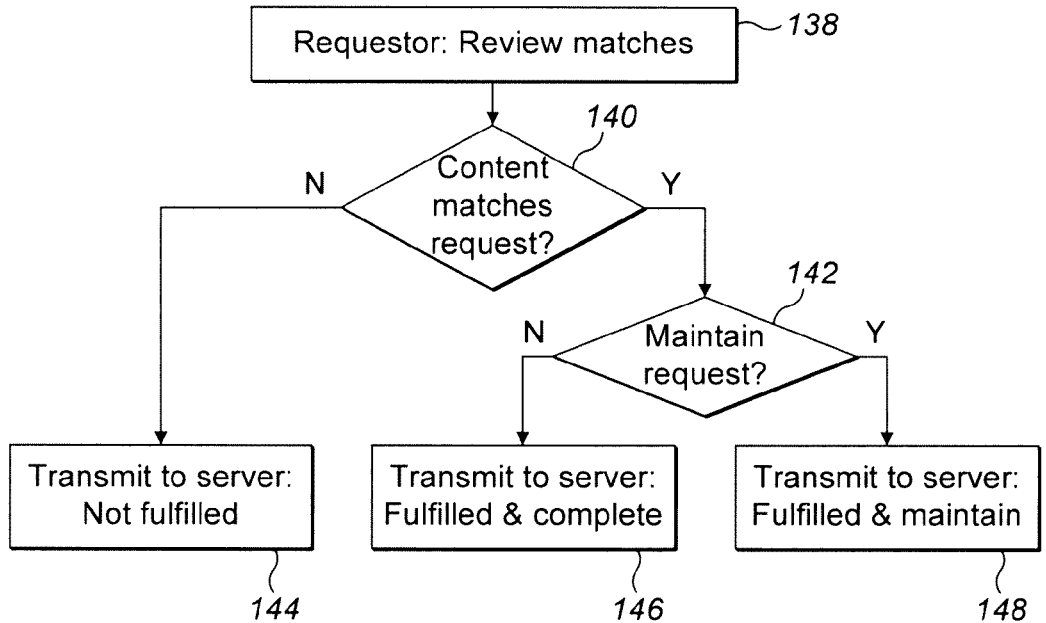
FIG. 8 illustrates an exemplary process for a requestor to assess the suitability of a live streams to a request.

FIGS. 7 and 8 describe such an alternative technique. FIGS. 7 and 8 correspond to FIGS. 5 and 6, but for this alternative technique.

With reference to FIG. 7, step 118 corresponds to step 98 of FIG. 5, and in this step the matching function makes a determination as to whether any matches are obtained. If no matches are obtained, then the matching function determines in step 136 to maintain the request as pending.

If a match is obtained, then in step 120 the matching function transmits the match to the requester, i.e. the viewing device associated with the request.

Turning to FIG. 8, in a step 138 the viewing device receives the matches.

In a step 140, the viewing device determines whether its request is fulfilled. The step 140 corresponds to the step 112 of FIG. 6.

If the viewing device determines that the request has not been fulfilled, then in step 144 the viewing device transmits a message to the server indicating that the request is not fulfilled.

If the request is fulfilled, then a further determination is made in step 142. The determination in step 142 is whether to maintain the request.

If the request is not to be maintained, then in a step 146 the viewing device transmits to the server a message indicating that the request is fulfilled and complete. If a determination is made in step 142 that the request is to be maintained, then in a step 148 the viewing device transmits to the server a message indicating that the request is fulfilled but it should be maintained.

Returning to FIG. 7, the message transmitted by the viewing device in any one of steps 144, 146, 148 is received by the server 4 in step 124.

In step 126 the server 4 makes a determination as to whether the request has been fulfilled. If the request has not been fulfilled, then the matching function moves to step 136. If the request has been fulfilled, the matching function moves to step 128.

In step 128 the matching function determines as to whether the request is to be maintained, in accordance with whether the message transmitted by the viewing device was a result of steps 146 or 148. If the request is to be maintained, then in step 130 the stream associated with the match is routed to the viewing device, but then the matching function moves on to step 136 and the request is maintained as pending.

If in step 128 it is determined that the request is fulfilled and complete, then in step 132 the stream associated with the match is routed to the viewing device, and then in step 134 the request is updated to have a status as fulfilled.

As has been described above, requests, or active searches, may be matched explicitly by contributors seeking to fulfil the request, or casually by streams contributed that happen to match.

Content provided by capture devices may be associated with a reputational score, based on how content from that capture device has been scored by requesters (users of viewing devices), or how often the content has been successfully matched. The content may therefore be associated with a feedforward score.

In reviewing the content, howsoever received, the viewer may provide feedback to up or down vote the stream based on how well they perceive the content matches the search. The content may therefore be associated with a feedback score. These votes affect that contributor's standing or reputation score as a provider of material categorised in each of the tags present.

These scores may affect direct contributors and casual match contributors differently. A direct contributor's standing may be affected on all tags that were meant or not meant to appear in the content, while a casual contributor's standing may only affect tags that do actually appear in their content and the request.

Reputation scores backed by a body of work are important for contributors to engage with paid-for requests.

Figure 9:
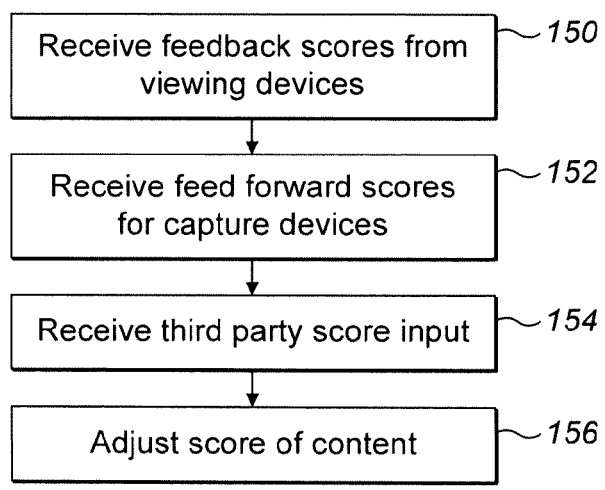
FIG. 9 illustrates an exemplary process for scoring content.

With reference to FIG. 9, there is illustrated a process by which scores associated with content are configured. These scores may be provided as tags for the content.

In accordance with step 150, feedback scores may be received from the viewing device for content, as discussed hereinabove.

As denoted in step 152, a feedforward score for a capture device may be associated with content. For example, this feedforward score may be associated with the tags provided with the content, which may indicate the location of the capture device being such that the likelihood of the content being relevant is "high".

As denoted by step 154, the server 2 may also receive score information from a third party. This third party may, for example, be a contents rights provider, which may provide a score associated with the content based on specific knowledge of particular capture devices. This may allow a third party to specifically provide a low or high rating score for content.

As denoted by step 156, the score of content is adjusted based on steps 150, 152 and 154. That is, the score of the content is determined based on the feedback information, the feedforward information, and the third party provided information.

One type of live content provision (though it is perishable content still) is with traditional broadcasters looking for exclusive footage of events. News, sports, cultural, music, demonstrations, etc . . . are all situations from which broadcasters have a need to source content. This can be expensive to do using in-house resources, but cost-effective by crowd-sourcing it.

The content service provided by the server 2 is able to fulfil these needs. As mentioned above, requesters may configure active searches/requests for content and wait for user-generated content to be matched. Users (at capture devices) willing to enter into transactions that allow their content to be sold can have these streams be picked up, as they happen by news organisations or similar, and for example fed directly to websites and TV stations as events unfold.

This automated matching of required tags in a search with a broadcaster's needs, together with the ability to specify a reputation threshold that a matched contributor must meet or exceed allows the organisation to source high quality exclusive content at a fraction of the cost of traditional outside broadcast facilities. In such a scenario, the broadcaster is a viewing device.

The description above refers to an example use-case being for a news organisation. In a news organisation use-case, a publisher of news could range from a small local news organisation to a large broadcaster providing news via their internet webpage.

A usual way to send out a journalist team is often combined with a time delay and not possible when no team is available. Also sending out an outside broadcasting van is generally a costly approach and needs also time and people.

On the other hand there is a high number of potential contributors who have their own device (such as a smart phone) and might be willing to contribute video material with a sufficient quality about an event in which the news organization has a certain interest. Such events could be unforeseen events like a traffic accident, an unannounced public meeting, or local weather conditions. However the events could also be ones which are too small to send out considerable infrastructure/teams to record and provide video material in an efficient and nearly-live fashion, like smaller sports or cultural events as well as local political presentations etc.

To support the reporting about such events in a cheap and fast way the techniques described herein can be utilized by sending out a request with appropriate metadata which describes an event. The metadata may also describe considerations from the news organisation of what it aims to get from the contributors (interviews, comments from audience, etc.). The receivers of such a request could be a known group of users that contributed before and have already a certain reputation, a group of users which have a current location that matches to the request which might be known by the geolocation information of their device, but also an undefined group of users.

Receivers of the request can use the techniques described herein to generate video material from the event and send it back to the requestor who can accept the content and use it for publishing the generated material in the way described above. Alternatively the broadcaster can use the broadcasters own webpage to incorporate the viewing stream.

In a news organisation use case there are four particular differences in emphasis, as discussed below.

Firstly, in this general description a general use-case is described in which a user defines a request and waits for it to be fulfilled. The emphasis, though not an essential requirement, is that this request may attract a small number of potential contributions from which the requestor will select the most relevant and then mark the request as fulfilled.

With a news organisation use case, the emphasis is shifted. There must be allowed the possibility for requests to garner a large number of contributions, a large number of which may be very relevant but which still do not cause the request to be closed (i.e. marked as fulfilled). The need being fulfilled for a news organisation use case is to source high volumes of quality content that may capture an event from many angles. Thus despite receiving lots of highly relevant contributions from users which are marked as fulfilling the requirements, and which go on to be used by the news organisation, the request is still left open in order to receive yet more input.

Secondly, since one of the sources of content a news organisation is looking to receive is from unexpected events (i.e. breaking news), a news organisation may create requests that are relatively vague. For example, nobody knows when the next high profile police car-chase/pursuit will be, but a news organisation does know that they want to capture content from it if they can. As such, they may create requests that have some specific information (e.g. "police", "urban setting", etc . . . ) but which have a very broad geographical context (e.g. 'UK' or 'London'). For example, a news organisation may only want to receive content from the area it serves. Again, this is a difference in emphasis— the idea that some aspects of the request may be very broadly defined rather than very specifically articulated. This is not to say that a news organisation would not make specific requests as well, but they would also make these more open, catch-all requests as well.

Thirdly, in a typical use-case scenario, a user may create a request for fulfilment. The emphasis in describing a process by which a contributor is made aware of such requests he might be able to fulfil is on the user seeing a list of relevant open requests when he opens an application associated with the service. With requests from a news organisation the emphasis may be slightly different. For a specific request (i.e. highly targeted one such as "capture content from the student demonstration on Broad Street, Oxford), potential contributors preferably receive alerts that prompt them to open the application associated with the service and start capturing content.

For more vaguely defined news organisation requests, users still need to be alerted to the possibility of creating content for them. This may be done by receiving alerts that bring the user into the application for the service whenever they enter a geographic zone covered by the news organisation (e.g. a user arrives in London and receives an alert that BBC London would like to use any content that covers weather, transport, local news). Users may subscribe to alerts from certain news organisations, so they may receive alerts about requests from some news organisations but not from others.

Fourthly, unlike a rights-holder event, streams that match the requirements of a news organisations request do not automatically attract rights restrictions. Users whose streams are matched in this way may decide whether or not their content can be licensed to a news organisation. They may do this in their settings menu by choosing one of three options, e.g.: (i) "never allow news organisations to use my content"; (ii) "always allow news organisations to use my content"; or (iii) "ask me for permission for each instance". In the third case, when a news organisation indicates that a stream matches its request and it wants to use it, a request for licensing is shown to the user. This may be as an overlay while they are still shooting the content, or an alert after the fact.

There are multiple ways that contributions may be rewarded. The listing of the contributor on the news organisation's webpage or within the credits of the published material might be motivation enough for people having a non-professional interest or starting to build up their own reputation in a journalistic environment. Embodiments can also be used to motivate contributors by promoting competitions, awarding the best contributions, or just paying a certain fee to every published contribution.

It can be understood, particularly from the above described use case, that the requestor of content can be anything from a private individual through to large organisations. Consequently, the provision of content to the requestor can have different forms as well as different levels or legal environment. The legal environment may be a simple surrender of rights on providing content, providing a license for usage of the content, selling of content and its rights etc.

The described techniques of providing content based on a request for content can thus one used in multiple different environments, with requests for content being made by individuals, organizations and rights holders.

In the above described examples, a request for content is made from a viewing device, i.e. a device that is requesting particular content to be delivered to it. This request may be from, for example, an individual user or a broadcaster.

In alternatives, the request for content may be received from a third party, with the resulting viewing stream being provided to one or more viewing devices. For example, a content rights holder may make the request, and then a viewing stream is created which can be accessed by any viewing device which is content rights holder approved.

The above examples relate to the analysis of live captured streams to fulfil a request.

A request may additionally or alternatively be fulfilled by accessing content stored at the server, or stored accessible to the server.

Content that is stored is stored with its associated tags, and its suitability for fulfilling a request is assessed in the same way as a live stream.

Figure 10:
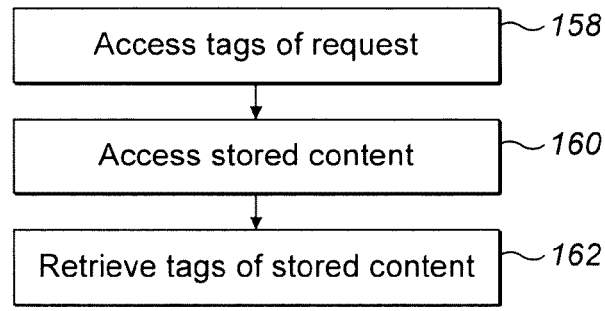
FIG. 10 illustrates an exemplary process for assessing stored content.

With reference to FIG. 10, there is illustrated a process similar to FIG. 4 for fulfilling a request by accessing stored content. A request may be fulfilled by accessing stored content alone, or by accessing stored content and live streamed content.

With reference to FIG. 10, in step 158 the tags of the request are accessed. In step 160 the stored content is accessed. In step 162 the tags of the stored content are retrieved.

Thereafter a matching function may be applied as described above with reference to either FIG. 5 or FIG. 7.

The above examples relate to the analysis of live captured streams and/or stored content to fulfil a request. A request may additionally or alternatively be fulfilled by inviting contributors (a user of a capture device) to provide content.

Figure 11:
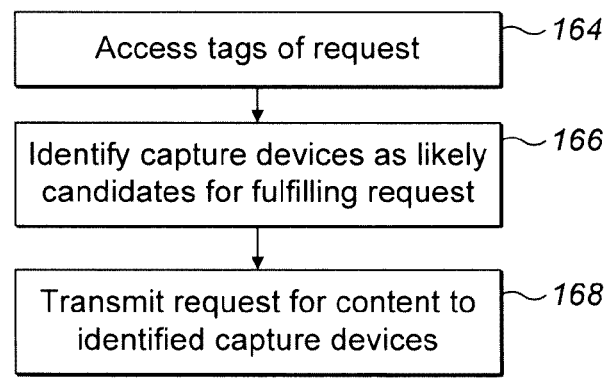
FIG. 11 illustrates an exemplary process for requesting content from capture devices.

With reference to FIG. 11, there is illustrated a process for fulfilling a request by inviting contributors to provide content, which process is equivalent to the process of FIG. 10 or the process of FIG. 4. This process may be implemented together with the processes of either FIG. 4 or FIG. 10, or in combination with one or both of those processes.

In a step 164, the tags associated with the request are accessed.

In step 166 capture devices which are likely candidates for fulfilling the request are identified. This identification may be based, for example, on the tags of the request and the tags of content which has previously been provided from particular capture devices, such as tags which indicate the location of the capture devices.

In a step 168 the server 2 transmits a request for content to any identified capture devices.

The matching function of FIG. 5 or FIG. 7 is then applied to any streams which are received by the server 2, which may include streams which are provided specifically responsive to the request as made in step 168.

Users who have contributed to a particular type of event in the past, or who have built up a reputation for quality contributions on a given topic, may receive notifications to begin contributing new content to a new event if they are nearby or close to one of an event's points of interest.

Thus content creators with a track record of capturing particular types of content may be invited to contribute to new events.

Organic growth of a group of users adding content to an event is encouraged. By matching contributors with the content they have shown they are good at capturing, the overall quality of available material improves.

By increasing the number of contributors, it is likely that more viewers will access the viewing stream, and a wider range of high quality submissions from which to choose material to feature or publish to a published stream will be provided. More users of all kinds involved with an event builds its profile and exposure to the wider public.

It is possible to create multi-camera content without creating a formal group of contributors first, drawing instead on those users who may wish to collaborate on an ad-hoc, casual basis. This creates a greater sense of community amongst content creators.

Better quality content is provided as a result of creators actively helping to improve/augment events with their own contributions.

As part of the configuration of a new content request, such as in step 80 of FIG. 2, a user may define how often it should receive notifications of new matches. A user may wish to be notified immediately for every new match, which is a suitable update mechanism for enthusiastic consumers or for automated processes. Users may alternatively wish to be notified hourly, daily or whenever the queue reaches a certain number of items for example.

In general, for any content request in a "pending" state, i.e. awaiting content to fulfil or complete it, newly identified matches will be added to a queue.

Preferences for a user may be stored in a user profile service. This may include information such as how often the user wishes to be notified of new matches. Preferences will be used as a default for every new content request created by the user, but can be overwritten on a request-by-request basis.

The above sets out various examples which may be implemented either alone or else in combination. Any example described is not limited in its implementation to the specific set of features with which it is described, and various features may be eliminated. Any examples described herein may be combined.

Any method described herein may be implemented a software process, and such software may be implemented as computer program code stored on any suitable device.

A request may be a request for a video stream, and need not be a request to film specific people. A request could be to provide:

A clip of the sunset over the pyramids while looking out of town so there is only the desert and the pyramids.

A how-to clip that shows how to correctly hang a painting.

A shopping trip to a particular store.

The request might be fulfilled automatically by the system when it sees a stream that happens to match the requirements, or it may be fulfilled explicitly by someone picking up the request and posting a scheduled event that will feature the requested content.

Figure 12:
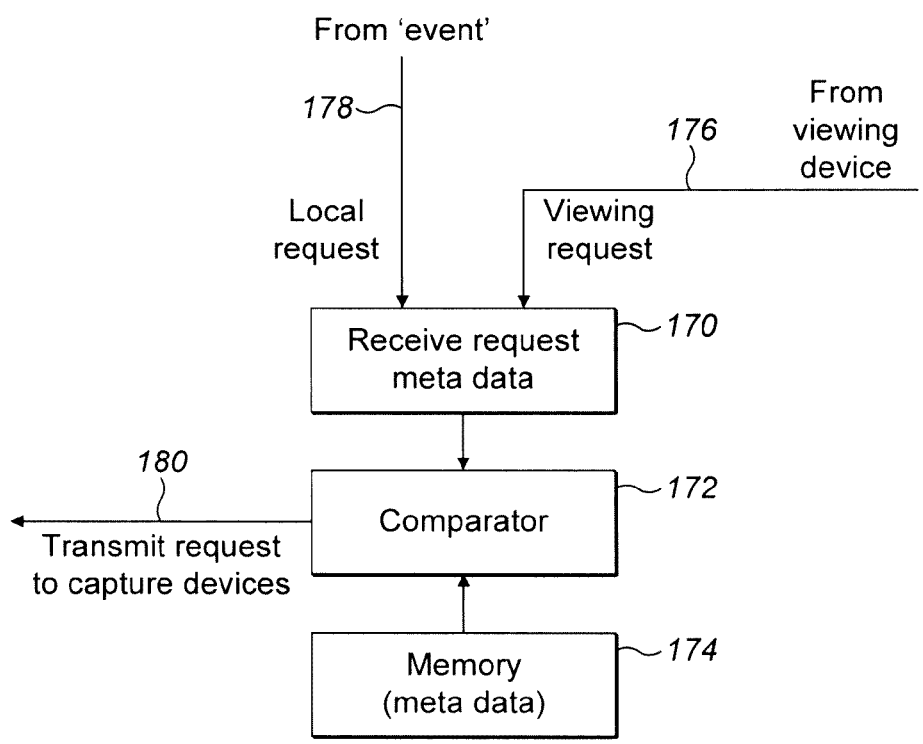
FIG. 12 illustrates an exemplary system for processing a request.

With reference to FIG. 12 a further illustration provides an additional example.

In this example a viewing device may provide a viewing request to a streaming server, or a streaming server may also receive a local request for example generated by an "event" which has been identified. This may be generated by, for example, an administrator associated with the event. The metadata associated with the request—being either a local request or a viewing request from a viewing device—is received, and is compared with metadata associated with the storage of a memory of the streaming server. The comparator is adapted to transmit a request to capture devices in accordance with the comparison operation. The capture devices may thus be controlled in order to provide video streams "on demand" based on demand requirements or requests from either an "event" or a viewing device.

In FIG. 12 there is shown an example in which a request is received on line 176 from a viewing device, or on line 178 in association with an event—which may be a locally generated (i.e. generated at or to the server) request.

The metadata associated with the received request is provided to a comparator 172, which compares the request metadata with the metadata in a memory 174 associated with stored content.

The comparator 172 can generate a request 180 to capture devices, for content.

The arrangement of FIG. 12 is in accordance with aspects of examples described herein.

It will be understood that in the foregoing description the examples of content are just set out. In general content may be any information or information source. Examples of content include, but are not limited to: video content, video streams, audio content, audio streams, an image, a blog entry, a website address etc.

All the examples and embodiments described herein may be implemented as processed in software. When implemented as processes in software, the processes (or methods) may be provided as executable code which, when run on a device having computer capability, implements a process or method as described. The execute code may be stored on a computer device, or may be stored on a memory and may be connected to or downloaded to a computer device.

The invention has been described above with reference to particular examples. The invention is not limited to any particular example set out. In particular the invention may be implemented by using parts of any example described. The invention also may be implemented by combining different parts of any described example. The scope of the invention is set forth in the appended claims.

The invention claimed is:

1. A server for providing content, the server being configured to:
   receive a viewing request for desired content from a content viewing device, the viewing request for desired content defining one or more characteristics of the desired content;
   identify a plurality of capture devices which are likely candidates for fulfilling the viewing request for the desired content based on the characteristics of the desired content;
   transmit a capture request for captured content to the identified plurality of capture devices;
   receive captured content from at least one of the plurality of capture devices;
   determine content to be delivered responsive to the viewing request in dependence on the received captured content, by comparing the received captured content to the one or more characteristics of the desired content; and
   transmit the content to be delivered to the content viewing device.

2. The server of claim 1 further configured to receive feedback relating to the content to be delivered from the viewing device in receipt of the content to be delivered.

3. The server of claim 2 further configured to determine the content to be delivered additionally in dependence on the feedback.

4. The server of claim 2 wherein the feedback provides an evaluation of a capture device contributing to the content to be delivered to the content viewing device.

5. The server of claim 1, wherein the received captured content is streamed content and the content to be delivered is configured to be transmitted as a single stream.

6. The server of claim 1 wherein the server determines the plurality of capture devices most likely to be associated with the characteristics of the viewing request.

7. The server of claim 6 wherein the server determines the plurality of content sources further in dependence on previous content received at the server from the plurality of content sources.

8. The server of claim 1 wherein the viewing request defines a time period for which the desired content is requested.

9. The server of claim 1 wherein the viewing request defines an event for which the desired content is requested.

10. The server of claim 1 wherein the viewing request is received from a rights holder, the determined content to be delivered to the viewing device being rights holder content.

11. The server of claim 1 wherein the server maintains the viewing request as pending if the viewing request cannot be fulfilled.

12. The server of claim 1 wherein the server maintains the viewing request as pending if the request is fulfilled, to further deliver content from additional capture devices based on the viewing request.

13. The server of claim 1 wherein the plurality of capture devices are a plurality of user devices.

14. The server of claim 1 further configured to, responsive to receipt of a viewing request for desired content from a content viewing device:
   access stored content; and
   further determine content to be delivered responsive to the viewing request in dependence on the stored content, by comparing the stored content to the one or more characteristics of the desired content.

15. The server of claim 1 further configured to, responsive to receipt of a viewing request for desired content from a content viewing device:
   access live streams of content; and
   further determine content to be delivered responsive to the viewing request in dependence on the accessed live streams of content, by comparing the accessed live streams of content to the one or more characteristics of the desired content.

16. A method for providing content, the method comprising:
   receiving a viewing request for desired content from a content viewing device, the viewing request for desired content defining one or more characteristics of the desired content;
   identifying a plurality of capture devices which are likely candidates for fulfilling the viewing request for the desired content based on the characteristics of the desired content;
   transmitting a capture request for captured content to the identified plurality of capture devices;
   receiving captured content from at least one of the plurality of content capture devices;
   determining content to be delivered responsive to the viewing request in dependence on the received captured content, by comparing the received captured content to the one or more characteristics of the desired content; and transmitting the content to be delivered to the content viewing device.

17. The method of claim 16 further comprising:

receiving feedback relating to the content to be delivered from the viewing device in receipt of the content to be delivered.

18. The method of claim 16 further comprising:

determining the plurality of capture devices most likely to be associated with characteristics of the viewing request in dependence on previous content received at the server from the plurality of capture devices, wherein the capture request is transmitted to the determined capture devices.

19. A non-transitory computer readable medium storing a program causing a computer to provide content, the providing of content comprising:

receiving a viewing request for desired content from a content viewing device, the viewing request for desired content defining one or more characteristics of the desired content;

identifying a plurality of capture devices which are likely candidates for fulfilling the viewing require for the desired content based on the characteristics of the desired content;

transmitting a capture request for captured content to the identified plurality of capture devices;

receiving the captured content from at least one of the plurality of capture devices;

determining content to be delivered responsive to the viewing request in dependence on the received captured content, by comparing the received captured content to the one or more characteristics of the desired content; and transmitting the content to be delivered to the content viewing device.

* * * * *